March 6, 1934.  C. W. KANOLT  1,950,374
PRODUCTION OF STEREOSCOPIC PICTURES
Filed June 14, 1929  6 Sheets-Sheet 1
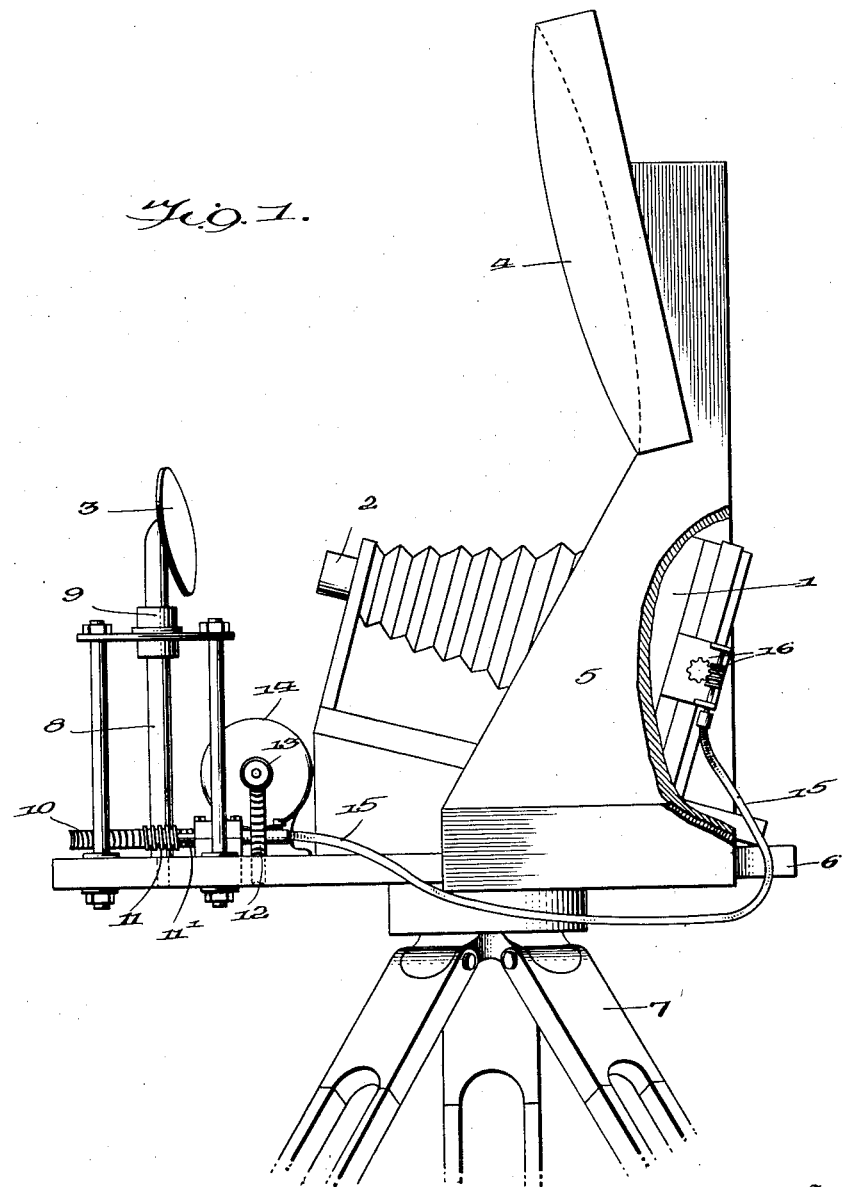

March 6, 1934. C. W. KANOLT 1,950,374
PRODUCTION OF STEREOSCOPIC PICTURES
Filed June 14, 1929 6 Sheets-Sheet 2
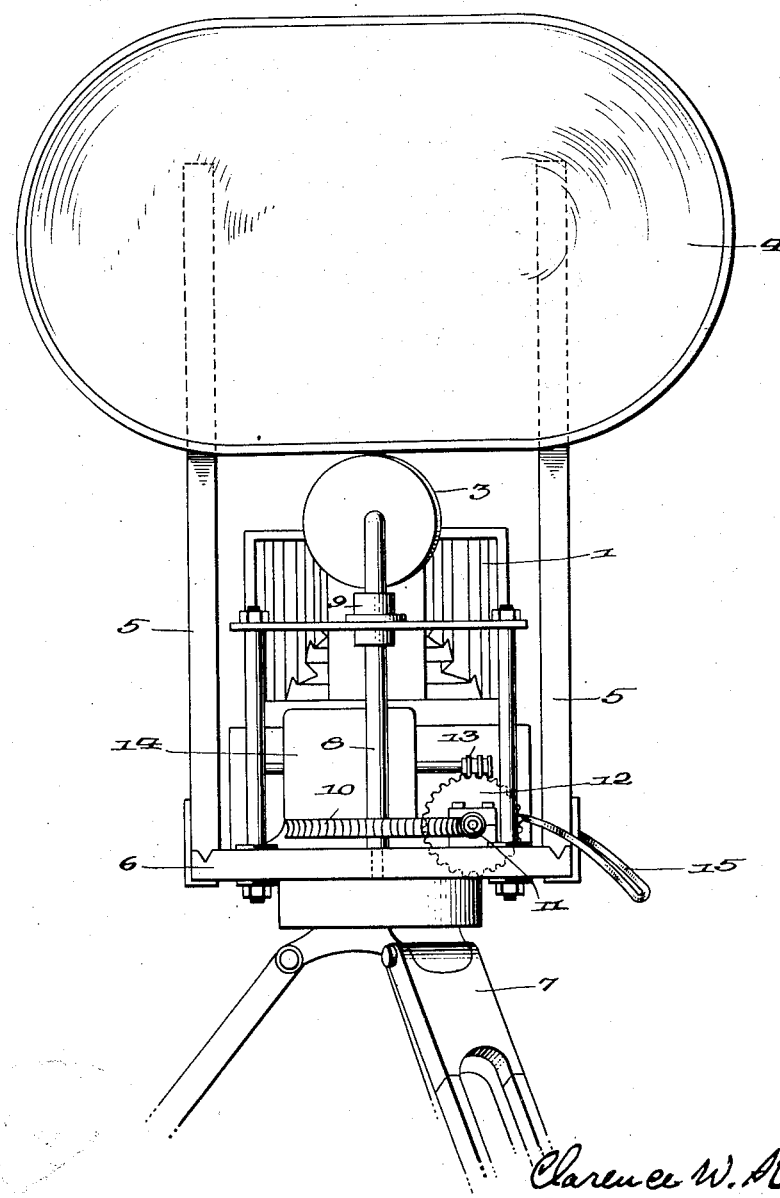

March 6, 1934.  C. W. KANOLT  1,950,374
PRODUCTION OF STEREOSCOPIC PICTURES
Filed June 14, 1929  6 Sheets-Sheet 3
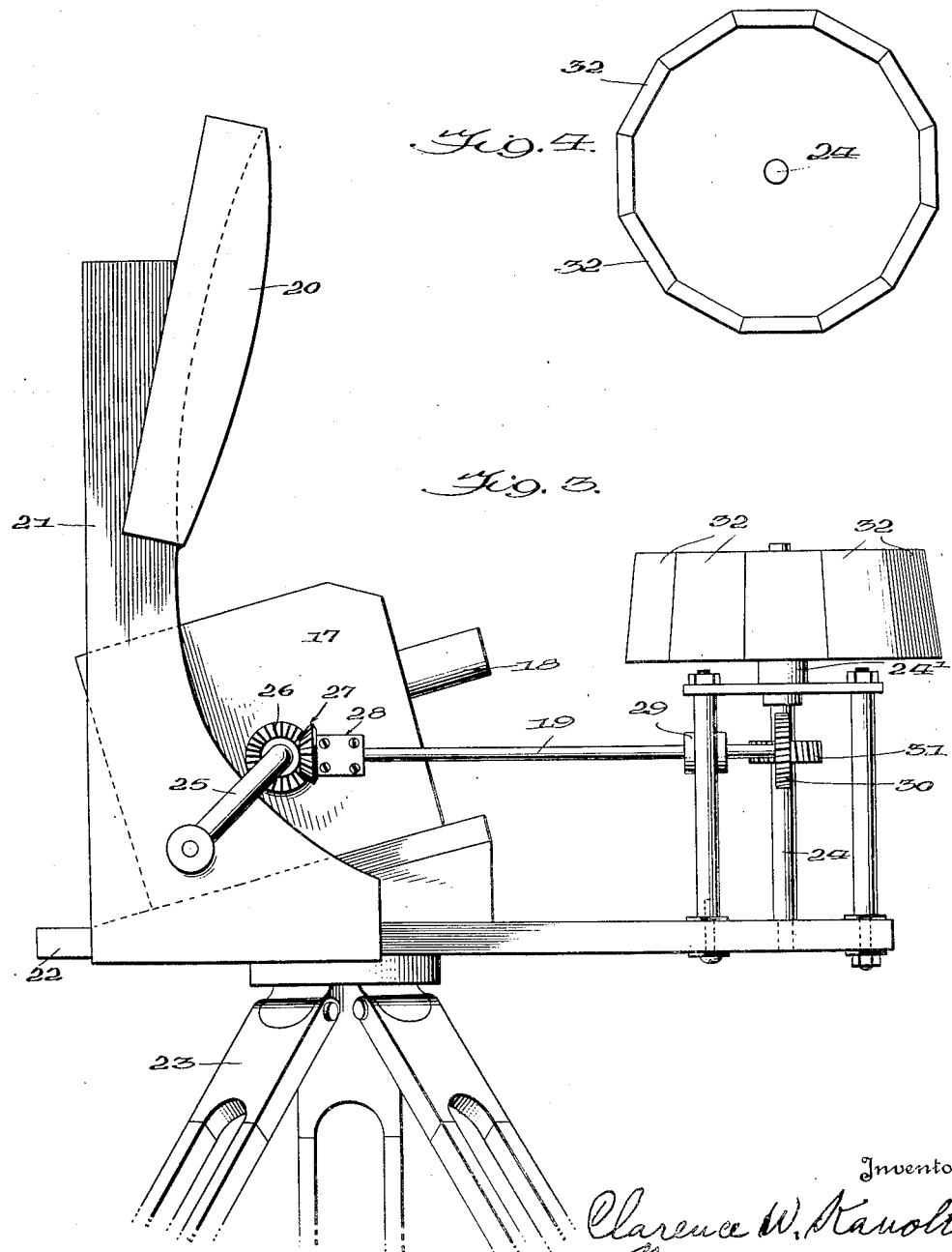

March 6, 1934. C. W. KANOLT 1,950,374
PRODUCTION OF STEREOSCOPIC PICTURES
Filed June 14, 1929 6 Sheets-Sheet 4

Inventor
Clarence W. Kanolt
By Vernon E. Hodges
his Attorney

March 6, 1934.  C. W. KANOLT  1,950,374
PRODUCTION OF STEREOSCOPIC PICTURES
Filed June 14, 1929  6 Sheets-Sheet 5
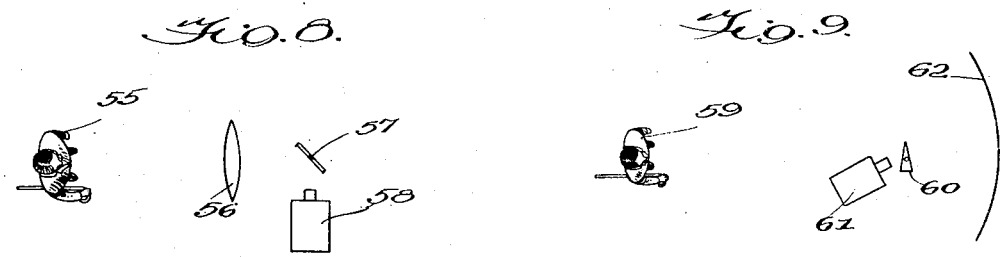
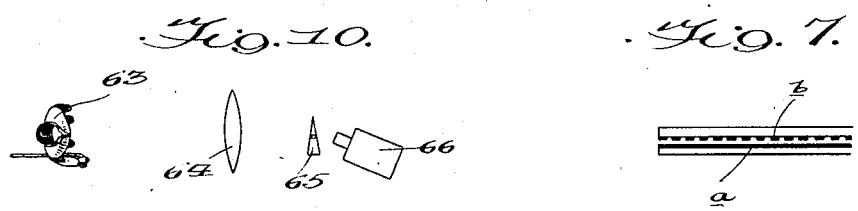
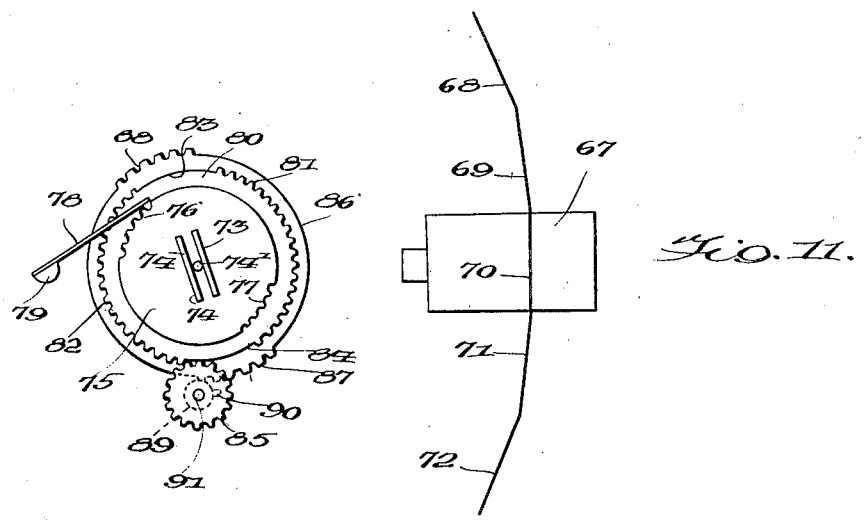
Inventor
Clarence W. Kanolt
By Vernon E. Hodges
his Attorney March 6, 1934.  C. W. KANOLT  1,950,374
PRODUCTION OF STEREOSCOPIC PICTURES
Filed June 14, 1929   6 Sheets-Sheet 6

Inventor
Clarence W. Kanolt
By Vernon E. Hodges
his Attorney

Patented Mar. 6, 1934

1,950,374

UNITED STATES PATENT OFFICE 1,950,374

PRODUCTION OF STEREOSCOPIC PICTURES

Clarence W. Kanolt, New York, N. Y.

Application June 14, 1929, Serial No. 370,994

24 Claims. (Cl. 88—16.6)

This invention relates to an improvement in the production of stereoscopic pictures.

It has been a great problem in the motion picture art particularly to develop some practical method of producing moving pictures so that they may be seen in stereoscopic relief and without the use of any instrument at the observer's eyes.

One of the objects of this invention is to provide for the production of stereoscopic pictures which may be viewed without the use of any instrument at the observer's eyes and by which the relief of the object viewed is presented.

The present invention is also applicable to still pictures of the type described in my prior Patent Number 1,150,374 of August 17, 1915. In my prior Patent No. 1,260,682 of March 26, 1918 was described a method by which still pictures of this type could be produced. The present invention is an improvement on this method, which renders it applicable to the production of motion pictures and which is also applicable to the production of still pictures, both of stereoscopic effect.

In the accompanying drawings:

Fig. 1 is a side elevation of one form of the invention as applied to the production of still pictures;

Fig. 2 is a front elevation of the same;

Fig. 3 is a side elevation of another form of the device as applied to the production of motion pictures;

Fig. 4 is a top plan view of the rotating plane mirrors of the device;

Fig. 7 is a plan view of a lined screen and sensitized plate spaced apart for ease of illustration;

Figs. 8, 9, 10 and 11 are diagrammatic views of other forms of the invention as applied to the production of either still or motion pictures;

Fig. 12 is a detailed side elevation partly in section of an arrangement of certain parts in a motion picture camera for use with the device shown in Fig. 11; and Fig. 13 is a diagrammatic plan view of a motion picture theatre showing how stereoscopic motion pictures may be exhibited.

Figure 5:
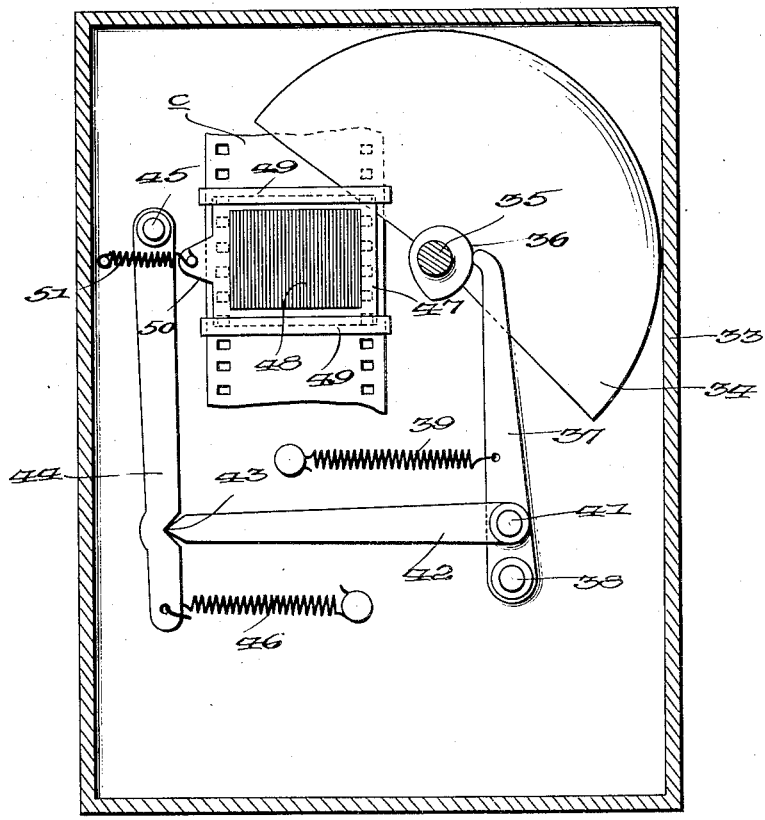
Fig. 5 is a detail sectional view of a portion of a motion picture camera showing the application of the invention thereto.

The device for making stereoscopic still pictures shown in Figs. 1 and 2 has the advantage over that shown in my Patent No. 1,260,682 of March 26, 1918, in that it does not require the presence of a smooth floor or track nor require the motion of the camera bodily over this floor or track.

As shown in Figs. 1 and 2, the camera 1 is provided with the usual lens 2 which may, however, be of a somewhat shorter focus than usually employed, and mounted in front of the lens 2 is a relatively small movable plane mirror 3 arranged to cooperate with a concave mirror 4, which reflects light from the object being photographed to the plane mirror 3, from which it is reflected to the lens 2 of the camera.

The concave mirror 4 is carried by supports 5 slidably mounted for movement backward or forward along a base-board 6, which carries the camera 1 and the associated mechanism. This base-board 6 is supported in the usual way by a tripod 7.

The plane mirror 3 is mounted on a vertical shaft 8 journaled in a bushing 9 supported on the base-board 6. The lower end of the shaft 8 has a worm gear 10 fixed thereto, with which a worm 11 meshes. A shaft 11' carries the worm 11 and also a worm gear 12 meshing with a worm 13 driven by an electric motor 14.

Figure 6:
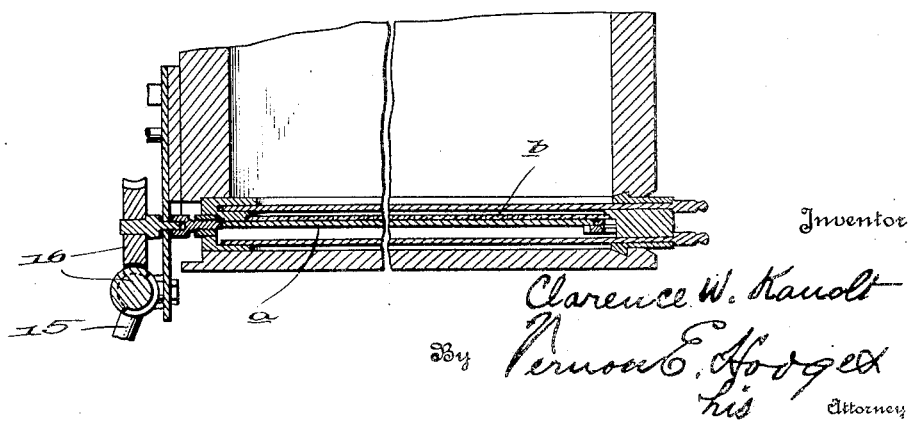
Fig. 6 is a sectional view through a portion of the camera shown in Figs. 1 and 2.
Figure 72:
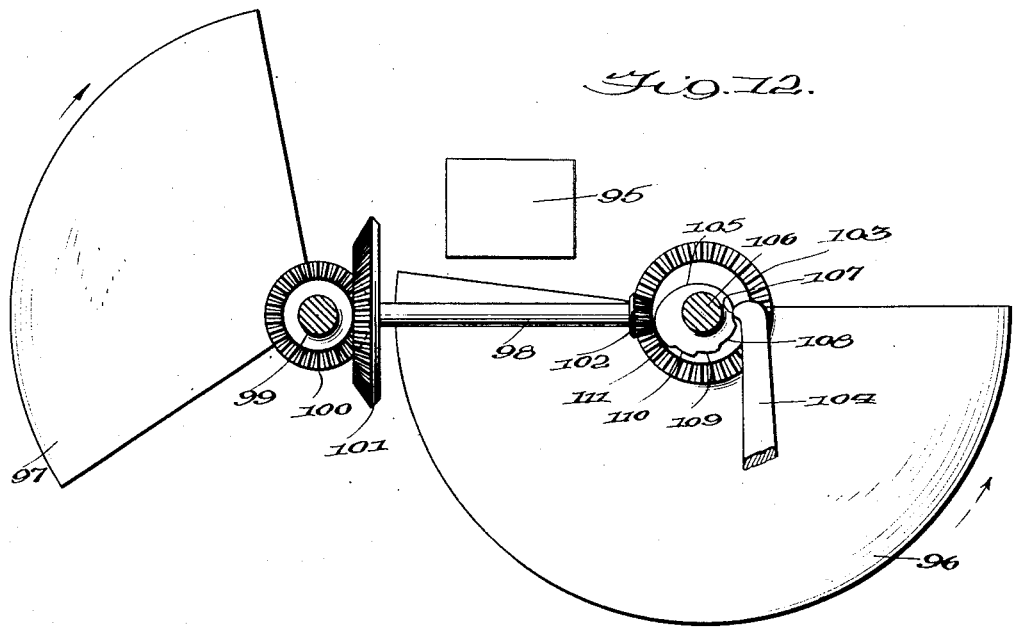
Figure 73:
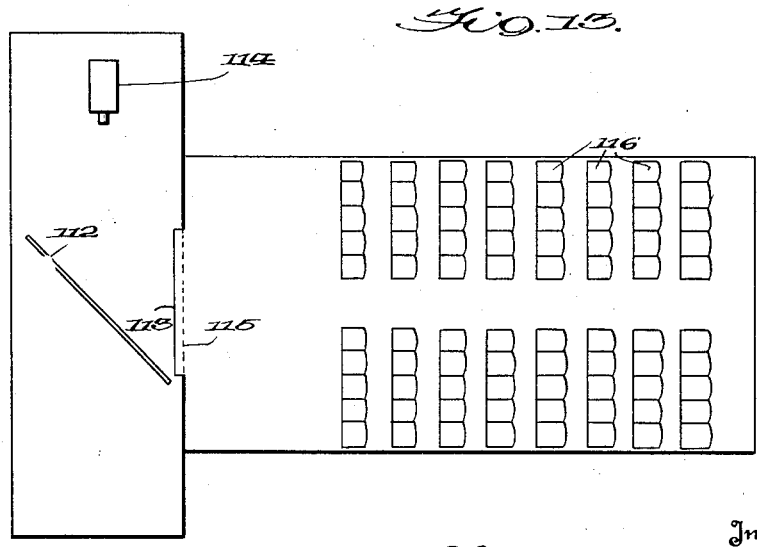

At its opposite end the shaft 11' has a flexible shaft 15 attached thereto, which extends to gearing 16 (see Fig. 6) which is connected with either the lined screen or photographic plate of the camera, as for instance the latter, as fully described and set forth in my prior Patent No. 1,260,682. The photographic sensitive plate, shown in Figs. 6 and 7, is designated by the letter $a$, while the lined screen is designated by the letter $b$, this lined screen being between the photographic plate $a$ and the lens of the camera in the form illustrated. The lined screen carries vertical opaque lines with narrow transparent spaces between them.

The mechanism above described is so adjusted that while the photographic plate $a$ is moved back of the lined screen a distance equal approximately to that between one line and the next, the plane mirror 3 is rotated enough to reflect to the camera lens 2, images reflected from successively changing areas across the width of the concave mirror 4. There are thus conveyed to the photographic plate views of the object photographed obtained by successively changing points of view.

The position of the concave mirror 4 should be so adjusted that an image of the object to be photographed may be focused approximately upon the surface of the plane mirror 3. When the concave mirror 4 is in this position, the rays of light from the central part of the object photographed falling upon any part of the concave mirror are all focused upon the plane mirror. The result is that as the plane mirror is rotated it delivers light from the object photographed to the lens 2, no matter from what part of the concave mirror 4 the plane mirror reflects light.

The positions of the lens 2 and the camera back carrying the photographic plate are to be so adjusted that the lens 2 focuses upon the photographic plate the image formed at the plane mirror 3 by the concave mirror 4. This usually will require the use of a lens of shorter focal length than is ordinarily employed with cameras of the size used.

The concave mirror 4 should preferably be of ellipsoidal form. However, as is well known, the properties of the ellipsoidal mirror can be obtained approximately with a spherical mirror provided the ratio of the diameter to the focal length is not too large.

While I have shown and described a mechanism driven by power supplied by an electric motor, I do not confine myself to this particular mechanism nor to the use of an electric motor as a source of power. Power might be supplied by a crank turned by hand or by a coiled spring wound up before the starting of the apparatus or by any other suitable means.

The device shown in Figs. 3, 4 and 5 is designed for the production of stereoscopic motion pictures. For this purpose, it has the advantage over the mechanism presented in my Patent No. 1,260,682, in that the present invention is capable of readily being operated so rapidly as to produce many pictures within a second of time.

In this form, the camera is designated by the numeral 17 and is provided with the usual lens 18. This camera is of the usual form of motion picture camera except as reconstructed or modified in a manner hereinafter referred to.

A concave mirror 20, similar to the concave mirror 4, is arranged over the motion picture camera 17 in position to reflect light from the object photographed to a series of moving plane mirrors, which reflect it to the lens 18 of the camera 17.

The concave mirror 20 is carried by supports 21 slidably mounted for either backward or forward movement along a base-board 22, which carries the camera 17 and its associated mechanism. This base-board is supported in the usual way on a tripod 23.

The motion picture camera 17 is operated by a handle 25, the shaft of which is connected through bevel gears 26 and 27 with a shaft 19 journalled in the bearings 28 and 29, which shaft 19 has its opposite end connected by the spiral gears 30 and 31 with a vertically extending shaft 24 extending upwardly from the base-board 22. The shaft 24 is journaled in a bearing 24' carried by the framework which, in turn, is supported by the base-board. The vertically extending shaft 24 carries at its upper end a series of plane mirrors 32, shown in Figs. 3 and 4, so arranged as to successively reflect light from the concave mirror 20 to the camera lens.

As shown in Fig. 5, a portion of motion picture film c is in position to be exposed in the portion 33 of the camera. A sector disc 34 is mounted within the camera to rotate between the film c and the lens of the camera in the usual way to momentarily prevent exposure of the film while the film is being moved from one position to the next.

The disc 34 is fixed to a shaft 35, on which is also mounted a cam 36, which actuates a lever 37 pivoted as at 38 and held against the cam 36 by a spring 39. Pivoted to the lever 37 as at 41 is a rod 42, which engages by a knife edge bearing 43 with a lever 44 pivoted as at 45 and having its outer end acted on by a spring 46, which holds it against the rod 42. Carried on the frame 47 is a lined screen 48, which frame is slidably mounted in guide-ways 49. The lined screen is interposed between the camera lens and the photographic film c, Fig. 5 representing a front elevation of a portion of the parts within the walls 33 of the motion picture camera. In this figure, most of the mechanical parts of the camera are omitted for the sake of clearness. The lined screen 48 corresponds with the lined screen used in the camera for the production of still pictures.

The frame 47, carrying the lined screen, also has a protuberance 50 on a side thereof, which is normally held in contact with the lever 44, so that the lined screen is moved by the lever. The frame is held in contact with the lever by a spring 51.

While the film c is stationary and the sector disc 34 is in such a position as to expose the film, the cam 36 is operating through the lever system to give the lined screen 48 a uniform horizontal motion between the film and the camera lens. Simultaneously, a single one of the mirrors 32 is passing in front of the lens 18 in such a manner as to reflect to the lens l'ght from the object photographed, reflected from successively changing areas of the concave mirror 20 as the corresponding mirror 32 is moved, so as to present to it different portions of the concave mirror 20. After the lined screen 48 has moved approximately the distance between two successive lines of the screen, the moving sector disc 34 intervenes between the lens and the film and interrupts the exposure. While the sector disk is thus preventing exposure, the mechanism of the motion picture camera moves the film far enough to expose a fresh surface and meanwhile the cam 36, operating through the lever system, permits the return of the lined screen 48 to its original position and at the same time, while the film is momentarily covered by the disc 34, the dividing line between two of the mirrors 32 passes the camera lens sufficiently for the second or another mirror to entirely fill the field from which light can be reflected to the lens.

The sector disc may be made considerably larger than is indicated in Fig. 5, in order that the whole of the part of the film adjacent to the lined screen may be covered or uncovered at almost the same instant.

The focusing and character of the mirrors and the camera lens above mentioned with reference to the production of still pictures apply equally well in this form for the production of motion pictures.

I do not wish to limit myself to the particular mechanism for moving the various parts that has been described and illustrated. Instead of giving the lined screen 48 a reciprocating motion, the screen may be given a continuous motion past the photographic film.

Instead of the lined screen carrying alternate opaque and transparent lines, as has been described, it may be constructed to focus the light that passes through it into the form of narrow vertical lines on the photographic film. This applies to the production of either still or motion pictures.

In Fig. 8 is illustrated diagrammatically the object to be photographed at 55. Instead of the concave mirror used above, a large convex lens 56 is employed cooperating with a rotating plane mirror 57, which reflects to the camera 58, light coming from successively changing parts of the convex lens 56. The camera may be either a motion picture or a still picture camera. In this arrangement, the camera is positioned with its axis approximately at right angles to a line passing through the object being photographed and the rotating mirror. The parts may be operated by any suitable mechanism, for instance, shown and described above.

Fig. 9 shows another form of the invention, in which the rotating plane mirror employed above is replaced by a rotating prism 60, which deflects to the lens of the camera 61 light coming from a part of the concave mirror 62, which depends upon the angle at which the prism is turned. A compound prism is preferably used to eliminate chromatic dispersion of the light passing through the prism. In this arrangement, the object being photographed is designated by the numeral 59.

In the form shown diagrammatically in Fig. 10, the object to be photographed is designated by the numeral 63 and a convex lens 64, which cooperates with a rotating prism 65, in turn directs the light to the camera 66.

The arrangement shown in Fig. 11 is somewhat similar to that illustrated in Figs. 1 and 2, but the concave mirror is replaced by an assemblage of plane mirrors 68, 69, 70, 71 and 72. The camera, which may be a motion picture camera, is designated by the numeral 67.

Two plane mirrors 73 and 74 are attached to a single vertical rotating shaft 74'. Each of these mirrors in turn reflects into the camera 67, light reflected from the object photographed by each of the fixed mirrors 68—72 successively. In this device, if an exposure was made during the actual motion of the mirrors 73 and 74, the luminous image on the photographic plate or film would be in rapid motion across the plate during exposure, and the photographic image produced would be blurred. It is necessary, therefore, to bring the mirrors 73, 74 to a stop for a time each time that light from one of the mirrors 68—72 is reflected to the camera. It is also necessary to protect the photographic film or plate from exposure while the position of the mirrors 73, 74 is changing from one angle to another.

This motion of the shaft 74' carrying the mirrors 73, 74 is controlled by a wheel 75 fixed to the shaft 74'. This wheel 75 has notches 76 and 77 in the periphery thereof engaged by a boss carried by a spring 78, having one end fixed as at 79. A spur wheel 80 is fixed to the shaft 74', and has a series of teeth 81 and 82 in the periphery thereof with blank portions 83 and 84 therebetween. The teeth 81 and 82 are in positions to mesh with a pinion 85 to turn the spur wheel 80. A wheel 86 is also carried on the shaft 74' and is provided with notches 87 and 88 at intervals. A small wheel 89 carries a single tooth 90 in position to engage at intervals the notches 87 and 88. A shaft 91 carries the gear 85 and the wheel 89 and is adapted to be rotated at constant speed.

In the position shown in Fig. 11, the mirrors 73, 74 are stationary, and the mirror 73 is in a position to reflect from the mirror 68 to the camera 67. In this position, the rotating wheel 85 does not engage any of the teeth of the stationary wheel 80. Upon the first rotation of the wheel 89, its tooth 90 will engage the first of the notches 87 on the wheel 86 and will turn this wheel a distance of one notch, thereby turning the mirrors so that mirror 73 reflects to the camera light from mirror 69.

Upon the next turn of the wheel 89, it will engage the next notch of the series 87 thereby bringing mirror 73 in position to reflect light from mirror 70. When the tooth 90 engages the last notch of the series 87, the teeth of the pinion 85 will begin to engage the series of teeth 81 on the wheel 80, thereby turning the mirrors until mirror 74 is brought into position to reflect light to the camera from mirror 68, when the wheel 85 ceases to engage any of the teeth 81. The tooth 90 then engages successively the notches 88, thereby causing mirror 74 to reflect light successively from the mirrors 69, 70, 71 and 72. This operation is continued, bringing the mirrors 73 and 74 into operative positions alternately.

The spring 78 serves to resiliently tend to hold the mirrors 73, 74 in their set positions until further motion is imparted thereto.

Simultaneously with the operation of this mechanism, it is necessary that a mechanism should be operated in the camera to shield the film from exposure while the position of the mirrors 73, 74 is changing. This is illustrated in Fig. 12 as applied to a motion picture camera. This illustration is similar to that of Fig. 5, in that it represents an elevation of certain of the parts at the lens end of the camera.

The area occupied by the portion of the film that is in position for exposure is designated diagrammatically by the numeral 95. The sector disc 96 is mounted to cover this portion of the film during the movement of the film from one position to another. Another sector disc 97 is mounted on a shaft 99 and rotates several times for each revolution of the disc 96. This motion is so, coordinating with that of the mechanism shown in Fig. 11, that it intervenes between the film and the lens whenever the mirrors 73, 74 are in motion. The shaft 99 is connected by gears 100 and 101 with a shaft 98, on which a pinion 102 is mounted, meshing with a gear 103 fixed on the shaft 106.

During these operations, the lined screen (not shown in Fig. 12) may be operated as indicated in Fig. 5 and given a continuous motion during the formation of the picture. For this purpose, the lever 104 corresponding with the lever 37 of Fig. 5 engages a cam 105 fixed on the shaft 106 and operated thereby. Instead of a continuous motion, the lined screen may be left stationary while the mirrors 73, 74 are stationary and moved only when these mirrors are moved.

This is accomplished by the formation of the cam 105, which has a series of steps 107, 108, 109, 110 and 111 of circular outline corresponding with stationary positions of the lined screen, which steps are designed to actuate the lever 104 to shift the lined screen successively with the movement of the mirrors.

It is not intended that the number of the plane mirrors 68—72 should be limited to five, as in Fig. 11. If the number of these mirrors is sufficiently large and if each subtends a sufficiently small angle from the object photographed, there will be produced a stereoscopic picture more or less approaching the properties thus produced by the concave mirror. Also, it is not intended that the number of rotating mirrors should be limited to two. In making motion pictures, there may be several such mirrors or even only one, while in making still pictures only one would be required.

After a stereoscopic motion picture negative film has been produced as above described, a positive film may be printed from it in the usual way. The exhibition of the stereoscopic motion pictures with the use of such a film would be based on the principles set forth in my Patent No. 1,150,374 of August 17, 1915. This is diagrammatically illustrated in Fig. 13.

A mirror 112 may be disposed at an angle to a translucent screen 113, upon which a picture is projected from behind by a motion picture projector 114. In front of the translucent screen 113 is a stationary lined screen 115. The seats of the theatre, from which the picture is to be viewed, are represented as at 116. The use of the mirror 112 prevents the image on the screen from being reversed as seen from in front, as the result of being projected from behind the screen. It also has the advantage of permitting the projector to be placed in a wing of the stage at a considerable distance from the screen.

I claim:

1. A photographic apparatus comprising a camera having means for supporting a sensitized surface, means in front of said sensitized surface for restricting the fall of light on separately restricted areas only thereof, and means for directing light to said sensitized surface from successively changing points of view of an object, while the object and camera remain stationary relative to each other.

2. A photographic apparatus comprising a camera having means for supporting a sensitized surface, means in front of said sensitized surface for restricting the fall of light on separately restricted areas only thereof, and means for diverting light to said sensitized surface from changing points of view of an object.

3. A photographic apparatus comprising a camera having a lens, and means for exposing in the camera a sensitized surface, means in front of said sensitized surface for restricting the fall of light on separately restricted areas only thereof to successively changing images of an object and including means for diverting to the lens of the camera light received from successively changing points of view.

4. A photographic apparatus comprising a camera having a lens, and means for exposing in the camera a photographic sensitive surface having in front of it means for restricting the fall of light to a plurality of separately restricted areas only of said sensitized surface and means movable relative to the lens of the camera to divert thereto light received from successively changing points of view.

5. A photographic apparatus including a camera adapted to contain a sensitized surface having in front of it means for restricting the fall of light simultaneously upon a plurality of separately restricted areas only of said sensitized surface and means for diverting to said sensitized surface light from successively changing points of view.

6. A photographic apparatus including a camera adapted to contain a sensitized surface having in front of it means for restricting the fall of light simultaneously upon a plurality of separately restricted areas only of said sensitized surface, a diverting element, and means for turning said diverting element to direct light to said sensitized surface from successively changing points of view.

7. A photographic apparatus including a camera adapted to contain a sensitized surface having in front of it means for restricting the fall of light simultaneously upon a plurality of separately restricted areas only of said sensitized surface, a light diverting element and means for turning said diverting element for causing an exposure of said sensitized surface to successively changing images of an object by directing light thereto from successively changing points of view.

8. A photographic apparatus including a camera adapted to contain a sensitized surface having in front of it means for restricting the fall of light simultaneously upon a plurality of separately restricted areas only of said sensitized surface and a lens, a light diverting element, and means for rotating said light diverting element for causing an exposure of said sensitized surface to successively changing images of an object by diverting light thereto from successively changing points of view.

9. A photographic apparatus including a camera adapted to contain a sensitized surface and a lens, a light refracting element, a reflecting means arranged in generally concave form for reflecting light to said refracting element from different portions of an object, and means for rotating said light refracting element for causing an exposure of the sensitized surface to successively changing images of an object by diverting light thereto from successively changing points of view.

10. A photographic apparatus including a camera adapted to contain a sensitized surface and a lens, a light refracting element, a reflecting means arranged in generally concave form for reflecting light to said refracting element from different portions of an object, and means for rotating said light refracting element for causing an exposure of the sensitized surface to successively changing images of an object by diverting light thereto from successively changing points of view, a lined screen interposed in front of the sensitized surface, and means for continuously causing relative movement of said sensitized surface and lined screen during the exposure.

11. A photographic apparatus including a camera adapted to contain a sensitized surface and a lens, a light reflecting element mounted in front of said camera, a concave mirror associated with the reflecting element to reflect thereto light from successively changing points of view of an object, means for rotating the reflecting element for diverting said light to the lens of the camera, a lined screen interposed in front of the sensitized surface, and means coordinated with the rotating means for causing relative continuous movement between the sensitized surface and the lined screen during exposure.

12. A photographic apparatus comprising a camera, a concave mirror, and turnable means for diverting light from different portions of the concave mirror to the camera.

13. A photographic apparatus comprising a camera adapted to contain a sensitized surface, at least one concave mirror, turnable light directing means for diverting light from different portions of the concave mirror to the camera, to expose to the sensitized surface light from successively changing points of view.

14. A photographic apparatus comprising a sensitized surface, a screen adjacent and in front of the sensitized surface for restricting the fall of light simultaneously upon a plurality of separately restricted areas only of said sensitized surface, a shutter for the camera, a lever for moving the screen, and a cam connected with the shutter for actuating said lever.

15. A photographic apparatus comprising a sensitized surface, a screen adjacent and in front of the sensitized surface for restricting the fall of light simultaneously upon a plurality of separately restricted areas only of said sensitized surface, leverage for moving the screen relative to the sensitized surface, a shutter for the camera, means for actuating the shutter, and cam means operatively connected with the shutter actuating means for actuating the leverage and screen simultaneously therewith.

16. A photographic apparatus comprising a camera having a lens, means for exposing a photographic sensitive surface having in front of it means for controlling the fall of light simultaneously upon a plurality of separately restricted areas only of said sensitized surface, and means for diverting to the lens of the camera light received from gradually changing points of view.

17. A photographic apparatus comprising a camera having a lens, means for exposing a photographic sensitive surface having in front of it means for controlling the fall of light simultaneously upon a plurality of separately restricted areas only of said sensitized surface, and means for diverting to the lens of the camera light received from gradually changing points of view without the necessity of moving the camera or object relative to each other.

18. A photographic apparatus comprising a camera having a lens, means for exposing in the camera a photographic sensitive surface having in front of it means controlling the fall of light simultaneously upon a plurality of separately restricted areas only of said sensitized surface, means movable relative to the lens of the camera to divert thereto light received from successively changing points of view, a substantial portion of the movement of said means occurring during exposure.

19. A photographic apparatus comprising a camera having a lens, means for exposing in the camera a photographic sensitive surface having in front of it means controlling the fall of light simultaneously upon a plurality of separately restricted areas only of said sensitized surface, a mirror, and means for turning the mirror relative to the lens of the camera to divert thereto light received from successively changing points of view, a substantial portion of the movement of the mirror occurring during exposure.

20. A photographic apparatus comprising a camera having a photographic sensitive surface, and a lined screen in front of said surface, a mirror, means for turning the mirror relative to the camera lens to divert thereto light from successively changing points of view of an object, and means for changing transversely the relative positions of the sensitive surface and screen during exposure.

21. A photographic apparatus comprising a camera having a photographic sensitive surface, and a lined screen in front of said surface, a mirror, means for turning the mirror relative to the camera lens to divert thereto light from successively changing points of view of an object, means for changing transversely the relative positions of the sensitive surface and screen during exposure, and means for synchronizing the turning of the camera with the changing of the relative positions of the sensitive surface and lined screen.

22. A photographic apparatus comprising a camera adapted to contain a sensitized surface, a light diverting element, means for turning said light diverting element, a lined screen in front of the sensitized surface, and means coordinated with the turning means for causing relative movement of the lined screen across the sensitized surface.

23. A photographic apparatus comprising a camera adapted to contain a sensitized surface, a lined screen in front of the sensitized surface, a light diverting element, means for turning said diverting element for diverting light to the camera from successively changing points of view of an object, and means coordinated with the turning means for causing movement of the lined screen relative to the sensitized surface at an angle to the strip images.

24. A photographic apparatus comprising a camera adapted to contain a sensitized surface, a lined screen in front of the sensitized surface, a light reflecting element for reflecting light to the camera from successively changing points of view of an object, means for rotating said reflecting element and means coordinated with the rotating means for causing movement of the lined screen relative to the sensitized surface at an angle to the strip images.

CLARENCE W. KANOLT.